United States Patent
Kelkar et al.

(10) Patent No.: US 6,800,586 B2
(45) Date of Patent: Oct. 5, 2004

(54) NO$_x$ REDUCTION COMPOSITION FOR USE IN FCC PROCESSES

(75) Inventors: Chandrashekhar P. Kelkar, Bridgewater, NJ (US); David Stockwell, Middlesex, NJ (US); Samuel Tauster, Englishtown, NJ (US)

(73) Assignee: Engelhard Corporation, Iselin, NJ (US)

( * ) Notice: Subject to any disclaimer, the term of this patent is extended or adjusted under 35 U.S.C. 154(b) by 73 days.

(21) Appl. No.: 10/001,485

(22) Filed: Nov. 23, 2001

(65) Prior Publication Data

US 2003/0098259 A1 May 29, 2003

(51) Int. Cl.⁷ ................................................ B01J 23/00
(52) U.S. Cl. ...................... 502/304; 502/303; 502/341; 502/344; 502/345; 502/346; 502/347; 502/348; 208/113; 208/120; 208/121; 208/149; 208/254 R
(58) Field of Search ................................. 208/113, 120, 208/121, 149, 254 R; 502/304, 341, 344, 345, 346, 347, 348, 303

(56) References Cited

U.S. PATENT DOCUMENTS

| | | | |
|---|---|---|---|
| 3,957,689 A | 5/1976 | Ostermaier et al. | 252/455 Z |
| 4,153,535 A | 5/1979 | Vasalos et al. | 208/120 |
| 4,458,623 A | 7/1984 | Lovqvist | 114/352 |
| 4,469,589 A | 9/1984 | Yoo et al. | 208/120 |
| 4,472,267 A | 9/1984 | Yoo et al. | 208/120 |
| 4,492,678 A | 1/1985 | Yoo et al. | 423/244 |
| 4,495,304 A | 1/1985 | Yoo et al. | 502/66 |
| 4,495,305 A | 1/1985 | Yoo et al. | 502/65 |
| 4,499,197 A | 2/1985 | Seese et al. | 502/65 |
| 4,542,188 A | 9/1985 | Van der Heijden | 525/240 |
| 4,628,042 A | 12/1986 | Speronello | 502/263 |
| 4,686,204 A | 8/1987 | Mester et al. | |
| 4,728,635 A | 3/1988 | Bhattacharyya et al. | 502/304 |
| 4,790,982 A | 12/1988 | Yoo et al. | 423/239 |
| 4,839,026 A | 6/1989 | Brown et al. | 208/120 |
| 4,847,225 A | 7/1989 | Lussier | 502/68 |
| 4,973,399 A | 11/1990 | Green et al. | 208/120 |
| 4,981,576 A | 1/1991 | Tait et al. | 208/111 |
| 5,002,654 A | 3/1991 | Chin | 208/121 |
| 5,021,146 A | 6/1991 | Chin | 208/122 |
| 5,037,538 A | 8/1991 | Chin et al. | 208/113 |
| 5,085,762 A | 2/1992 | Absil et al. | 208/120 |
| 5,194,413 A | 3/1993 | Kumar | 502/65 |
| 5,364,517 A | 11/1994 | Dieckmann et al. | 208/121 |
| 5,565,181 A | 10/1996 | Dieckmann et al. | 423/239.1 |
| 5,591,418 A | 1/1997 | Bhattacharyya et al. | 423/239.1 |
| 5,750,020 A | 5/1998 | Bhattacharyya et al. | 208/113 |
| 6,107,240 A | 8/2000 | Wu et al. | 502/304 |
| 6,129,834 A | 10/2000 | Peters et al. | 208/120.01 |
| 6,143,167 A | 11/2000 | Peters et al. | 208/113 |
| 6,165,933 A | 12/2000 | Peters et al. | 502/330 |

FOREIGN PATENT DOCUMENTS

| | | | | |
|---|---|---|---|---|
| EP | 0 320 860 | 6/1989 | | B21H/17/68 |
| ES | 2 092 429 | 11/1996 | | B01D/53/60 |
| WO | WO 95/03876 | 2/1995 | | B01D/53/60 |
| WO | WO 00/44493 | 3/2000 | | B01J/23/10 |

*Primary Examiner*—Walter D. Griffin
*Assistant Examiner*—James Arnold, Jr.
(74) *Attorney, Agent, or Firm*—Raymond F. Keller

(57) ABSTRACT

A composition for controlling NO$_x$ emissions during FCC processes comprises (i) an acidic oxide support, (ii) cerium oxide, (iii) a lanthanide oxide other than ceria such as praseodymium oxide, and (iv), optionally, an oxide of a metal from Groups Ib and IIb such as copper, silver and zinc.

16 Claims, No Drawings

$NO_x$ REDUCTION COMPOSITION FOR USE IN FCC PROCESSES

BACKGROUND OF THE INVENTION

A major industrial problem involves the development of efficient methods for reducing the concentration of air pollutants, such as carbon monoxide, sulfur oxides and nitrogen oxides in waste gas streams which result from the processing and combustion of sulfur, carbon and nitrogen containing fuels. The discharge of these waste gas streams into the atmosphere is environmentally undesirable at the sulfur oxide, carbon monoxide and nitrogen oxide concentrations that are frequently encountered in conventional operations. The regeneration of cracking catalyst, which has been deactivated by coke deposits in the catalytic cracking of sulfur and nitrogen containing hydrocarbon feedstocks, is a typical example of a process which can result in a waste gas stream containing relatively high levels of carbon monoxide, sulfur and nitrogen oxides.

Catalytic cracking of heavy petroleum fractions is one of the major refining operations employed in the conversion of crude petroleum oils to useful products such as the fuels utilized by internal combustion engines. In fluidized catalytic cracking processes, high molecular weight hydrocarbon liquids and vapors are contacted with hot, finely-divided, solid catalyst particles, either in a fluidized bed reactor or in an elongated transfer line reactor, and maintained at an elevated temperature in a fluidized or dispersed state for a period of time sufficient to effect the desired degree of cracking to lower molecular weight hydrocarbons of the kind typically present in motor gasoline and distillate fuels.

In the catalytic cracking of hydrocarbons, some nonvolatile carbonaceous material or coke is deposited on the catalyst particles. Coke comprises highly condensed aromatic hydrocarbons and generally contains from about 4 to about 10 weight percent hydrogen. When the hydrocarbon feedstock contains organic sulfur and nitrogen compounds, the coke also contains sulfur and nitrogen. As coke accumulates on the cracking catalyst, the activity of the catalyst for cracking and the selectivity of the catalyst for producing gasoline blending stocks diminishes. Catalyst which has become substantially deactivated through the deposit of coke is continuously withdrawn from the reaction zone. This deactivated catalyst is conveyed to a stripping zone where volatile deposits are removed with an inert gas at elevated temperatures. The catalyst particles are then reactivated to essentially their original capabilities by substantial removal of the coke deposits in a suitable regeneration process. Regenerated catalyst is then continuously returned to the reaction zone to repeat the cycle.

Catalyst regeneration is accomplished by burning the coke deposits from the catalyst surfaces with an oxygen containing gas such as air. The combustion of these coke deposits can be regarded, in a simplified manner, as the oxidation of carbon and the products are carbon monoxide and carbon dioxide.

When sulfur and nitrogen containing feedstocks are utilized in catalytic cracking process, the coke deposited on the catalyst contains sulfur and nitrogen. During regeneration of coked deactivated catalyst, the coke is burned from the catalyst surface that then results in the conversion of sulfur to sulfur oxides and nitrogen to nitrogen oxides.

The conditions experienced by the catalyst in a fluid catalytic cracking (FCC) unit are very severe. Catalyst is continuously being cycled between reductive atmosphere on the reactor side to an oxidative atmosphere on the regenerator side. The temperatures between the two zones are different so the catalyst experiences thermal shocks. Also the regenerator contains nominally about 15–25% steam. All these factors lead to a significant decline in the catalyst activity and fresh catalyst needs to be continuously added to maintain the cracking activity.

Various approaches have been used to either reduce the formation of noxious gases or treat them after they are formed. Most typically, additives have been used either as an integral part of the FCC catalyst particles or as separate particles in admixture with the FCC catalyst.

The additive that has gained the widest acceptance for lowering sulfur oxide emissions to date in FCC units (FCCU) is based upon Magnesium oxide/Magnesium aluminate/ceria technology. Pt supported on clay or alumina is most commonly used as an additive for lowering of carbon monoxide emissions. Unfortunately the additives used to control CO emissions typically cause a dramatic increase (e.g. >300%) in $NO_x$ evolution from the regenerator.

Various approaches have been used to treat nitric oxide gases in FCCU. For example, U.S. Pat. No. 5,037,538 describes the reduction of oxides of nitrogen (NOx) emissions from an FCC regenerator by adding a deNOx catalyst to the FCC regenerator in a form whereby the deNOx catalyst remains segregated within the FCC regenerator.

U.S. Pat. No. 5,085,762 describes the reduction of emissions of noxious nitrogen oxides with the flue gas from the regenerator of a fluid catalytic cracking plant by incorporating into the circulating inventory of cracking catalyst separate additive particles that contain a copper-loaded zeolite material having a characteristic structure with a defined X-ray diffraction pattern.

U.S. Pat. No. 5,002,654 describes a process for regeneration of cracking catalyst while minimizing NOx emissions using a zinc-based deNOx catalyst.

U.S. Pat. No. 5,021,146 describes a process for regeneration of cracking catalyst while minimizing NOx emissions using a Group IIIb based deNOx additive.

U.S. Pat. Nos. 5,364,517 and 5,364,517 describe the reduction of the NOx content of FCC regenerator flue gas is reduced using a spinel/perovskite additive.

U.S. Pat. Nos. 5,750,020 and 5,591,418 describe process for removing sulfur oxides or nitrogen oxides from a gaseous mixture in an FCC process using a collapsed composition which is substantially composed of microcrystallites collectively of the formula:

$$M_{2m}{}^{2+}Al_{2-p}M_p{}^{3+}T_rO_{7+r-s}$$

where $M^{2+}$ is a divalent metal, $M^{3+}$ is a trivalent metal, and T is vanadium, tungsten, or molybdenum.

U.S. Pat. No. 6,165,933 describes compositions comprising a component containing (i) an acidic oxide support, (ii) an alkali metal and/or alkaline earth metal or mixtures thereof, (iii) a transition metal oxide having oxygen storage capability, and (iv) palladium; to promote CO combustion in FCC processes while minimizing the formation of NOx.

U.S. Pat. Nos. 6,129,834 and 6,143,167 describe compositions comprising a component containing (i) an acidic oxide support, (ii) an alkali metal and/or alkaline earth metal or mixtures thereof, (iii) a transition metal oxide having oxygen storage capability, and (iv) a transition metal selected from Groups Ib and/or IIb of the Periodic Table; to provide NOx control performance in FCC processes.

All the additives added to FCC units need to have sufficient hydrothermal stability to withstand the severe environment of an FCCU and there remains the need for NOx additives to be used in FCC that have improved hydrothermal stability.

SUMMARY OF THE INVENTION

The invention provides novel compositions suitable for use in FCC processes that are capable of providing improved $NO_x$ control performance.

In one aspect, the invention provides compositions for reducing $NO_x$ emissions in FCC processes, the compositions containing (i) an acidic oxide support, (ii) ceria (iii) at least one oxide of a lanthanide series element other than ceria, and (iv), optionally, at least one oxide of a transition metal selected from Groups Ib and IIb of the Periodic Table. The acidic oxide support preferably contains alumina. Praseodymium oxide is the preferred lanthanide oxide other than ceria. Cu and Ag are preferred Group Ib transition metals and Zn is the preferred Group IIb transition metal.

In another aspect, the invention encompasses FCC processes using the $NO_x$ reduction compositions of this invention either as an integral part of the FCC catalyst particles or as separate particles admixed with the FCC catalyst.

These and other aspects of the invention are described in further detail below.

DETAILED DESCRIPTION OF THE INVENTION

The invention encompasses the discovery that certain classes of compositions are very effective for the reduction of $NO_x$ gas emissions in FCC processes. Moreover, such compositions have unexpectedly improved hydrothermal stability over prior art compositions. The $NO_x$ reduction compositions of the inventions are characterized in that they comprise (i) an acidic oxide support, (ii) cerium oxide (iii) at least one oxide of a lanthanide series element other than ceria, and (iv), optionally, at least one oxide of a transition metal selected from Groups Ib and IIb of the Periodic Table and mixtures thereof.

The acidic oxide support should be of sufficient acidity for the composition to act as an effective $NO_x$ reduction additive. Acidic oxide catalyst supports are well know to those of ordinary skill in the art and include, for example, transitional aluminas such as gamma and eta alumina, silica-stabilized versions of said aluminas, including the silica-stabilized alumina spinel formed by leaching silica from kaolin calcined through its characteristic exotherm to form the spinel, or mullite. The support may be crystalline or amorphous. Preferably, the acidic oxide support contains at least some alumina. More preferably, the oxide support contains at least 50 wt. % alumina. The oxide support is preferably an oxide selected from the group consisting of alumina and silica-alumina. Where an amorphous silica-alumina support is used, the support preferably has an alumina to silica molar ratio of from about 1:1 up to about 50:1. Examples of commercially available acidic oxide alumina supports are available under tradenames such as PURALOX, CATAPAL and VERSAL. Examples of commercially available acidic silica-alumina supports are available under the tradenames such as SIRAL and SIRALOX.

The silica-alumina support can optionally be created by the caustic leaching of silica from preformed kaolin microspheres as described in U.S. Pat. Nos. 4,847,225 and 4,628,042, which are hereby incorporated by reference for their teachings in this regard. Preferably, the kaolin that is subject to caustic leaching is calcined substantially through its characteristic exotherm to form spinel and/or mullite. More preferably, the caustic leached kaolin support is a microsphere whereby the caustic leached kaolin is bound with aluminum chlorohydroxide before calcination through the exotherm.

The acidic oxide support further preferably has sufficient surface area to facilitate the $NO_x$ reduction process. Preferably, the oxide support has a surface area of at least about 20 m$^2$/g, more preferably from about 50 up to about 300 m$^2$/g. The acidic oxide support may be a powder which is preferable when used as an integral part of the FCC catalyst or a microsphere or particle, preferably when used as an admixture with FCC catalysts.

The amount of the cerium oxide (ceria) present in the $NO_x$ reduction composition may be varied considerably relative to the amount of acidic oxide support. Preferably, the $NO_x$ reduction composition contains at least about 0.5 part by weight of cerium oxide per 100 parts by weight of the acidic oxide support material, more preferably from at least about 1 part by weight up to about 25 parts by weight of cerium oxide per 100 parts of the acidic oxide support material.

The lanthanide oxides other than ceria include at least one metal oxide having oxygen storage capability similar to that of ceria. Preferably, the lanthanide oxide other than ceria is praseodymium oxide. The amount of the lanthanide oxide other than ceria present in the $NO_x$ reduction composition may be varied considerably relative to the amount of acidic oxide support. Preferably, the $NO_x$ reduction composition contains from at least about 0.05 part by weight of oxide per 100 parts by weight of the acidic oxide support material, more preferably from at least about 1 part by weight up to about 25 parts by weight of lanthanide oxide other than ceria mixture per 100 parts of the acidic oxide support material. The amount of ceria to the lanthanide oxides other than ceria present in the NOx reduction composition of this invention can be as high as 500:1 by weight. Exemplified below are NOx reduction compositions containing an acidic oxide support, ceria, and at least one lanthanide oxide other than ceria, wherein the amount of ceria to the amount of the lanthanide oxides other than ceria is in the range of from 1.66:1 to 5:1 by weight.

The Group Ib and/or IIb transition metals may be any metal or combination of metals selected from those groups of the Periodic Table. Preferably, the transition metal is selected from the group consisting of Cu, Ag, Zn and mixtures thereof. The amount of transition metal present is preferably at least about 100 parts by weight (measured as metal oxide) per million parts of the oxide support material, more preferably from about 0.1 up to about 5 parts by weight per 100 parts of the oxide support material.

The $NO_x$ reduction composition may contain minor amounts of other materials, which preferably do not adversely affect the $NO_x$ reduction function in a significant way. The $NO_x$ reduction composition may consist essentially of items (i)–(iv) mentioned above. Where the composition of the invention is used as an additive particle for an FCC process, the $NO_x$ reduction composition may be combined with fillers (e.g. clay, silica-alumina, silica and/or alumina particles) and/or binders (e.g. silica sol, alumina sol, silica alumina sol, etc.) to form particles suitable for use in an FCC process, preferably by spray drying before the calcination of step. More preferably, porous particles, also known as microspheres, are formed from acidic oxide support typically by spray drying powdered oxide support material combined with a binder/filler before or after impregnation with the individual constituents. Preferably, any added binders or fillers used do not significantly adversely affect the performance of the $NO_x$ reduction component.

Where the $NO_x$ reduction composition is used as an additive particulate (as opposed to being integrated into the FCC catalyst particles themselves), the amount of $NO_x$ reduction component in the additive particles is preferably at least 50 wt %, more preferably at least 75 wt. %. Most preferably, the additive particles consist entirely of the $NO_x$ reduction component. The additive particles are preferably of a size suitable for circulation with the catalyst inventory in an FCC process. The additive particles preferably have an average particle size of about 20–200 $\mu$m. The additive particles preferably have attrition characteristics such that they can withstand the severe environment of an FCCU.

As previously mentioned the $NO_x$ reduction composition of the invention may be integrated into the FCC catalyst particles themselves. In such case, any conventional FCC catalyst particle components may be used in combination with the $NO_x$ reduction composition of the invention. If integrated into the FCC catalyst particles the $NO_x$ reduction composition of the invention preferably represents at least about 0.02 wt. % the FCC catalyst particle, more preferably about 0.1–10 wt. %.

While the invention is not limited to any particular method of manufacture, the $NO_x$ reduction composition of the invention is preferably made by the following procedures:

(a) co-impregnate the acidic oxide support particles with a cerium oxide source, at least one lanthanide oxide source other than ceria, and, optionally, at least one source of a Group Ib/IIb element.

(b) calcine the impregnated support of step (a).

The sources of oxides are preferably slurries, sols and/or solutions of the metal oxides themselves or salts of the respective metals, which decompose to oxides on calcination, or combinations of oxides and salts. If desired, the individual constituents may be separately added to the support particles with a calcination step in between each addition. The calcination steps are preferably performed at about 450–750° C.

The $NO_x$ reduction composition may be used as a separate additive particle or as an integral part of an FCC catalyst particle. If used as an additive, the $NO_x$ reduction component may itself be formed into particles suitable for use in a FCC process. Alternatively, the $NO_x$ reduction component may be combined with binders, fillers, etc. by any conventional technique. See for example, the process described in U.S. Pat. No. 5,194,413, the disclosure of which is incorporated herein by reference.

Where the $NO_x$ reduction component of the invention is integrated into an FCC catalyst particle, preferably the component is first formed and then combined with the other constituents which make up the FCC catalyst particle. Incorporation of the $NO_x$ reduction composition directly into FCC catalyst particles may be accomplished by any known technique. Examples of suitable techniques for this purpose are disclosed in U.S. Pat. Nos. 3,957,689; 4,499,197; 4,542,118 and 4,458,023, the disclosures of which are incorporated herein by reference.

The compositions of the invention may be used in any conventional FCC process. Typical FCC processes are conducted at reaction temperatures of 450 to 650° C. with catalyst regeneration temperatures of 600 to 850° C. The compositions of the invention may be used in FCC processing of any typical hydrocarbon feedstocks. Preferably, the compositions of the invention are used in FCC processes involving the cracking of hydrocarbon feedstocks which contain above average amounts of nitrogen, especially residual feedstocks or feedstocks having a nitrogen content of at least 0.1 wt. %. The amount of the $NO_x$ reduction component of the invention used may vary depending on the specific FCC process. Preferably, the amount of $NO_x$ reduction component used (in the circulating inventory) is about 0.1–15 wt. % based on the weight of the FCC catalyst in the circulating catalyst inventory. The presence of the compositions of the invention during the FCC process catalyst regeneration step dramatically reduces the level of $NO_x$ emitted during regeneration while having improved hydrothermal stability.

EXAMPLE 1

2% $Pr_6O_{11}$/10% $CeO2$/2% CuO/Alumina

Alumina support particles are coimpregnated with a solution of cerium and praseodymium nitrate by incipient wetness, dried and calcined at 1200° F. for 2 hours to achieve a 10% $CeO_2$ and 2 wt % $Pr_6O_{11}$ level. On the microsphere, copper nitrate is impregnated, dried and calcined at 1200° F. for 2 hours to achieve a 2 wt % CuO level.

EXAMPLE 2

3% $La_2O_3$/10% $CeO_2$/3% $Nd_2O_3$/2% CuO/Alumina

Alumina support particles are coimpregnated with a solution of lanthanum, cerium and neodymium nitrate by incipient wetness, dried and calcined at 1200° F. for 2 hours to achieve a 10% $CeO_2$ and 2 wt % $Nd_2O_3$ level. On the microsphere, copper nitrate is impregnated, dried and calcined at 1200° F. for 2 hours to achieve a 2wt % CuO level.

EXAMPLE 3

2% $Pr_6O_{11}$/10% $CeO_2$/2% CuO/Alumina

Alumina support particles are coimpregnated with a solution of cerium, praseodymium and copper nitrate by incipient wetness, dried and calcined at 1200° F. for 2 hours to achieve a 10% $CeO_2$/2% $Pr_6O_{11}$/2% CuO level.

EXAMPLE 4

2% $Pr_6O_{11}$/10% $CeO_2$/1.5% $Nd_2O_3$/2% CuO on Alumina

Alumina support particles are coimpregnated with a solution of cerium, praseodymium and neodymium nitrate by incipient wetness, dried and calcined at 1200° F. for 2 hours to achieve a 10% $CeO_2$/10 wt % $Pr_6O_{11}$ 1.5% $Nd_2O_3$ level. On this microsphere, copper nitrate is impregnated, dried and calcined at 1200° F. for 2 hours to achieve a 2 wt % CuO level.

COMPARATIVE EXAMPLES

Example A

3% $Na_2O$/10% $CeO_2$/2% CuO on Alumina

Alumina support particle are impregnated with sodium nitrate by incipient wetness, dried and calcined at 1200° F. for 2 hours to achieve 3.0 wt % $Na_2O$. The Na-containing alumina particles are coimpregnated with a solution of cerium and copper nitrate and calcined at 1200° F. for 2 hours to achieve a 10 wt % $CeO_2$, 2% CuO level.

Example B

5% MgO/10% $CeO_2$/2% CuO Alumina

Alumina support particles are impregnated with magnesium nitrate by incipient wetness, dried and calcined at 1200° F. for 2 hours to achieve a 5.0% MgO level. The Mg-containing alumina particles are coimpregnated with a solution of cerium and copper nitrate and calcined at 1200° F. for 2 hours to achieve a 10% $CeO_2$, 2 wt % CuO level.

Example C

10% $CeO_2$ on Alumina

Alumina support particles are impregnated with cerium nitrate by incipient wetness, dried and calcined at 1200° F. for 2 hours to achieve a 10% $CeO_2$ level.

Example D

10% $Pr_6O_{11}$ on Alumina

Alumina support particles are impregnated with praseodymium nitrate by incipient wetness, dried and calcined at 1200° F. for 2 hours to achieve a 10% $Pr_6O_{11}$ level.

As previously stated hydrothermal stability is an important property of FCC catalysts and additives. Different methods are known in the art to perform accelerated hydrothermal deactivation of FCC catalysts and additives in the laboratory. The most common procedure for hydrothermal laboratory deactivation is to steam the catalyst or additive in the presence of 100% steam at temperatures ranging from 1300° to 1500° F. for 4 to 8 hours. The additives tested were deactivated by steaming at 1500° F. for 4 hours in 100% steam. NO uptakes were measured at room temperature on the additive after reduction in hydrogen at 1000° F. Data from NO uptake tests using Examples 1–4 and A–D are shown below in Table 1. NO uptake retention is the percentage of the NO uptake capacity retained after steaming.

TABLE 1

| | NO uptake × $10^5$ Mol/g | NO uptake retention, % (As-is – Steamed) |
|---|---|---|
| Example A | 1.39 | 22 |
| Example B | 1.13 | 28 |
| Example C | 0.75 | 30 |
| Example D | 0.58 | 32 |
| Example 1 | 4.45 | 65 |
| Example 2 | 4.9 | 67 |
| Example 3 | 4.61 | 67 |
| Example 4 | 3.58 | 64 |

As can be seen, Examples 1 through 4, within the scope of the present invention, yielded substantial NO uptake and NO uptake retention relative to Examples A and D. The results of the testing are particularly unexpected in that each of ceria and praseodymium oxide alone yielded little NO uptake (Examples C and D).

We claim:

1. A NOx removal composition suitable for reducing NOx emissions during catalyst regeneration in a fluid catalytic cracking process, said composition comprising (i) an acidic oxide support, (ii) cerium oxide, (iii) at least one oxide of a lanthanide series element other than cerium oxide, and (iv), at least one oxide of a transition metal selected from Groups Ib and IIb of the Periodic Table and mixtures thereof, wherein the ratio of (ii) to (iii) range from at least 1.66:1 by weight.

2. The composition of claim 1 wherein said acidic oxide support is selected from the group consisting of alumina and silica-alumina.

3. The composition of claim 2 wherein said acidic oxide support is alumina.

4. The composition of claim 2 wherein said acidic oxide support is silica-alumina.

5. The composition of claim 4 wherein said silica alumina has an alumina:silica mole ratio of from about 1:1 up to about 50:1.

6. The composition of claim 4 wherein the said silica-alumina is prepared by caustic leaching of silica from calcined kaolin.

7. The composition of claim 4 wherein the said silica-alumina is prepared by the caustic leaching of silica from kaolin calcined through its characteristic exotherm.

8. The composition of claim 7 where the caustic leached kaolin support is a microsphere whereby the caustic leached kaolin is bound with aluminum chlorohydroxide before calcination through its characteristic exotherm.

9. The composition of claim 1 wherein said Group Ib and IIb transition metals are selected from the group consisting of copper, silver, zinc and mixtures thereof.

10. The composition of claim 1 wherein said cerium oxide is present in amounts of from at least about 0.5 part by weight per 100 parts by weight of said acidic oxide support.

11. The composition of claim 1 wherein said oxide of a lanthanide series element other than cerium oxide is praseodymium oxide.

12. A fluid cracking catalyst composition comprising (a) a cracking component suitable for catalyzing the cracking of hydrocarbons, and (b) a NOx reduction composition comprising (i) an acidic oxide support, (ii) cerium oxide, (iii) at least one oxide of a lanthanide series element other than ceria, and (iv) an oxide of a transition metal selected from Groups Ib and IIb of the Periodic Table wherein the ratio of (ii) to (iii) ranges from at least 1:66:1 by weight, said NOx reduction composition being an integral component of the catalyst composition particles, being separate particles from the catalyst component or mixtures thereof and being present in the cracking catalyst in a sufficient NOx reducing amount.

13. The cracking catalyst of claim 12 wherein said cracking catalyst comprises an admixture of component (a) and component (b).

14. The cracking catalyst of claim 12 wherein said cracking catalyst comprises integral particles which contain both component (a) and component (b).

15. The cracking catalyst of claim 12 wherein the NOx reduction composition (b) comprises about 0.1 to 15 wt % of the cracking catalyst composition.

16. The cracking catalyst of claim 12 wherein said oxide of a lanathnide series element other than ceria is praseodymium oxide.

* * * * *